(12) United States Patent
Ohara et al.

(10) Patent No.: US 6,215,272 B1
(45) Date of Patent: Apr. 10, 2001

(54) FUEL CELL DEVICE

(75) Inventors: Hideo Ohara, Katano; Makoto Uchida, Hirakata; Yuko Fukuoka, Kyoto; Yasushi Sugawara, Neyagawa; Nobuo Eda, Hirakata; Keiichi Iiyama, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/457,401

(22) Filed: Dec. 9, 1999

(30) Foreign Application Priority Data

Dec. 10, 1998 (JP) .................................................. 10-351051

(51) Int. Cl.$^7$ ....................................................... H02J 7/00
(52) U.S. Cl. ........................................... 320/104; 320/103
(58) Field of Search .................................... 320/104, 103; 307/46, 64, 66, 149

(56) References Cited

U.S. PATENT DOCUMENTS 5,212,431 * 5/1993 Origuchi et al. ..................... 180/65.4
5,389,825 * 2/1995 Ishikawa et al. ...................... 307/71
5,686,766 * 11/1997 Tamechika ............................. 307/43

FOREIGN PATENT DOCUMENTS 50-116925   9/1975   (JP) .

* cited by examiner

*Primary Examiner*—Peter S. Wong
*Assistant Examiner*—Lawrence Luk
(74) *Attorney, Agent, or Firm*—Stevens, Davis, Miller & Mosher, LLP

(57) ABSTRACT

A fuel cell device, wherein, after an output voltage from a main body of a fuel cell is converted using a converter, the relation between the resultant predetermined output voltage V 1 and an output voltage V 2 from a secondary battery is so set as to satisfy V 1>V 2. When, at the time of a sudden change of an external load, the output voltage V from the main body of the fuel cell becomes lower than a predetermined voltage V 3, an output to a charge controlling unit is stopped. When the output voltage V from the main body of the fuel cell is lowered even further and becomes lower than a predetermined voltage V 4, an output to an auxiliary device, which is necessary for driving the fuel cell device, is switched from the output from the converter to the output from the secondary battery.

6 Claims, 5 Drawing Sheets

FUEL CELL DEVICE

BACKGROUND OF THE INVENTION

The present invention relates to a fuel cell device. More particularly, it relates to a fuel cell device suitable for a fuel cell such as a solid polymer electrolyte fuel cell in which hydrogen is used as the fuel and the air is employed as the oxidant.

Stacking unit cells, in each of which an electrolyte layer is held by being sandwiched between a fuel flow field and an air flow field, forms the main body of the fuel cell. The fuel flow field and the air flow field are supplied with fuel gas and air, respectively. Then, an electrical chemical reaction is caused to occur, thereby generating the electric power. Moreover, the main body of the fuel cell has a characteristic that, if a load current density is increased, activated polarization of an electrode catalyst, the ohmic loss and the concentration polarization bring about a drop in an output voltage from the fuel cell. On account of this, when power output is performed to an external load that consumes the power with the fuel cell as the power supply, the main body of the fuel cell is used as the following system: The use of a DC-DC converter or a DC-AC converter makes it possible to output, as a constant voltage, a direct current power outputted from the fuel cell. Also, the main body of the fuel cell is slow in the response of the output voltage to a variation in the load current density. Because of this, when a sudden change occurs in the external load, the output voltage is temporarily lowered exceedingly, becoming an output voltage smaller than the minimum operation voltage that the external load side requires. This has resulted in a fear that the system itself may come to a halt.

In order to solve this problem, in publications such as JP-A-50-116925, the following system has been proposed: A secondary battery is located in parallel to the fuel cell and, at the time of the sudden change of the external load, the power is supplied from the secondary battery to the external load so that the external load variation on the fuel cell side is reduced.

However, in the system where, as illustrated in FIG. 2, the power is supplied from the secondary battery to the external load at the time of the sudden change of the external load, a voltage needed for charging the secondary battery differs from a voltage needed for the load. This has required that the DC-DC converter or the DC-AC converter be equipped with 2 lines of outputs, i.e., an output for the load and an output for charging the secondary battery, thereby bringing about complexities and cost-up of the appliances.

Also, as illustrated in FIG. 3, in the case of a system where the output for charging the secondary battery is branched from the output line for the load, it turns out that the output line for the secondary battery is inputted into the DC-DC converter or the DC-AC converter. At that time, the power to be supplied from the secondary battery to the load is outputted to the load by way of the DC-DC converter or the DC-AC converter. As the result, the power from the secondary battery is multiplied by conversion efficiency of the DC-DC converter or that of the DC-AC converter. This has caused the power loss to occur.

SUMMARY OF THE INVENTION

In order to solve the above-described problems, it is an object of the present invention to effectively supply the fuel cell device with the power from the secondary battery at the time of the sudden change of the external load, and to simplify the system and to provide the fuel cell device that is inexpensive.

In order to solve the above-described problems, the fuel cell device according to the present invention includes a main body of the fuel cell, a DC-DC converter or a DC-AC converter for converting a direct current power into a direct current of a predetermined voltage V $1$ or an alternating current thereof, the direct current power being outputted from the main body of the fuel cell, an output terminal to an external load, an auxiliary device necessary for driving the fuel cell device, a secondary battery that, when the output from the main body of the fuel cell is lacking, outputs an output voltage V $2$ for driving the auxiliary device, the auxiliary device being necessary for driving the fuel cell device, a charge controlling unit for controlling charge of the secondary battery, and a circuit-switching controlling unit for controlling supply of the output current from the DC-DC converter or the DC-AC converter to the output terminal to the external load, the auxiliary device and the charge controlling unit, and for controlling supply of the output power from the secondary battery, the auxiliary device being necessary for driving the fuel cell device, wherein, when the output voltage V from the main body of the fuel cell becomes lower than a predetermined voltage V $3$ at the time of a sudden change of the external load, the output to the charge controlling unit is stopped, and in addition, when the output voltage V from the main body of the fuel cell becomes lower than a predetermined voltage V $4$, the output to the auxiliary device is switched from the output from the DC-DC converter or the DC-AC converter to the output from the secondary battery, the auxiliary device being necessary for driving the fuel cell device, the relation between the output voltage V $1$ from the DC-DC converter or the DC-AC converter and the output voltage V $2$ from the secondary battery being so set as to satisfy V $1>$V $2$.

The configuration of another fuel cell device related to the present invention is as follows: When the output voltage V from the main body of the fuel cell becomes higher than a predetermined recovering voltage V $6$ after the sudden change of the external load of the fuel cell device, the output to the charge controlling unit is restarted, and when the output voltage V from the main body of the fuel cell becomes higher than a recoverying voltage V $7$, the output to the auxiliary device is restarted, the auxiliary device being necessary for driving the fuel cell device.

The employment of the configuration as described above permits a stable load output to be obtained even at the time of the sudden change of the external load, thus making it possible to provide the fuel cell device that is simple, inexpensive and highly effective.

DESCRIPTION OF THE EMBODIMENTS

Figure 1:
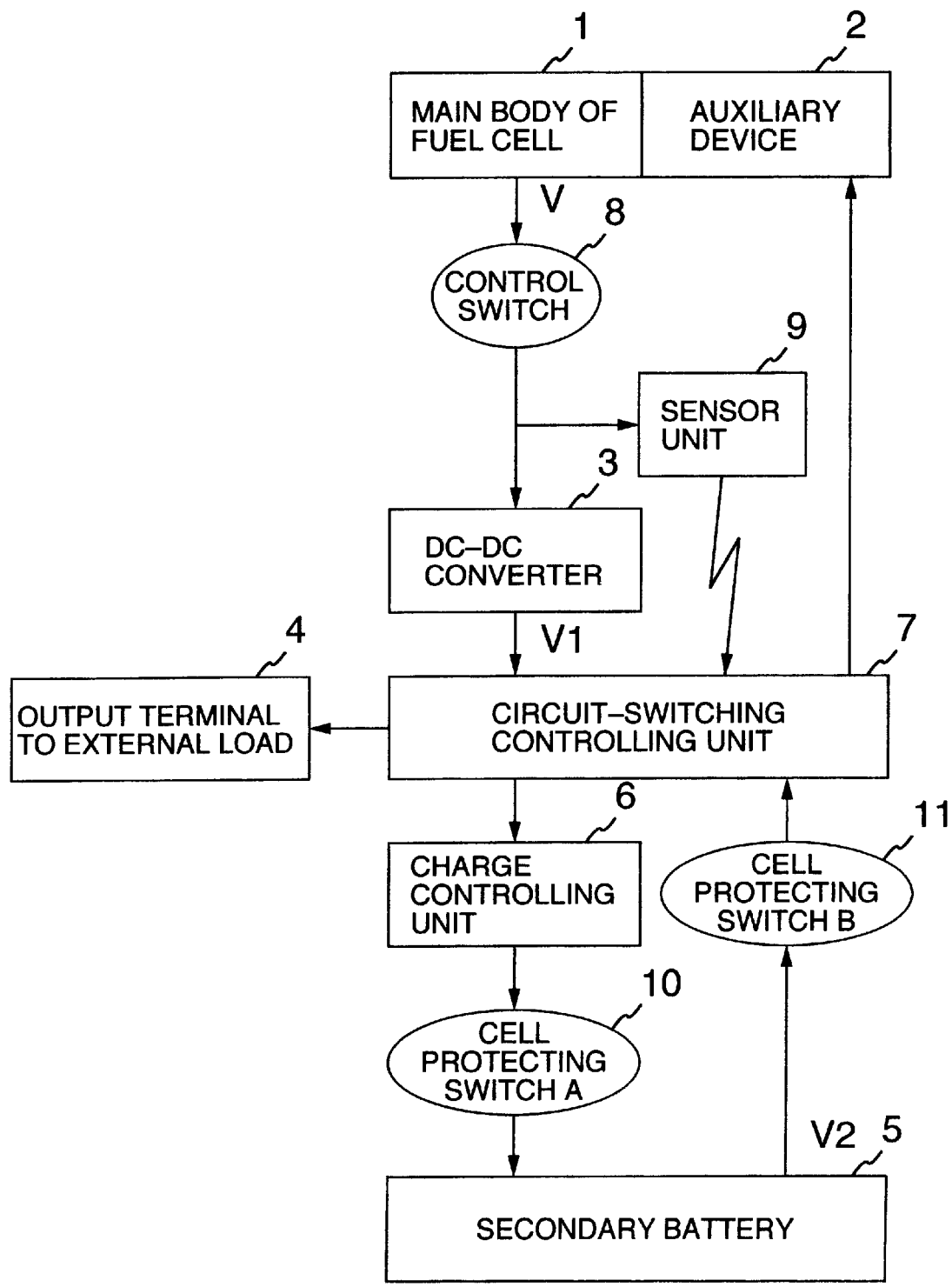
FIG. 1 is a schematic configuration diagram of a power supply system that employs the solid polymer electrolyte fuel cell in an embodiment of the present invention.
Figure 2:
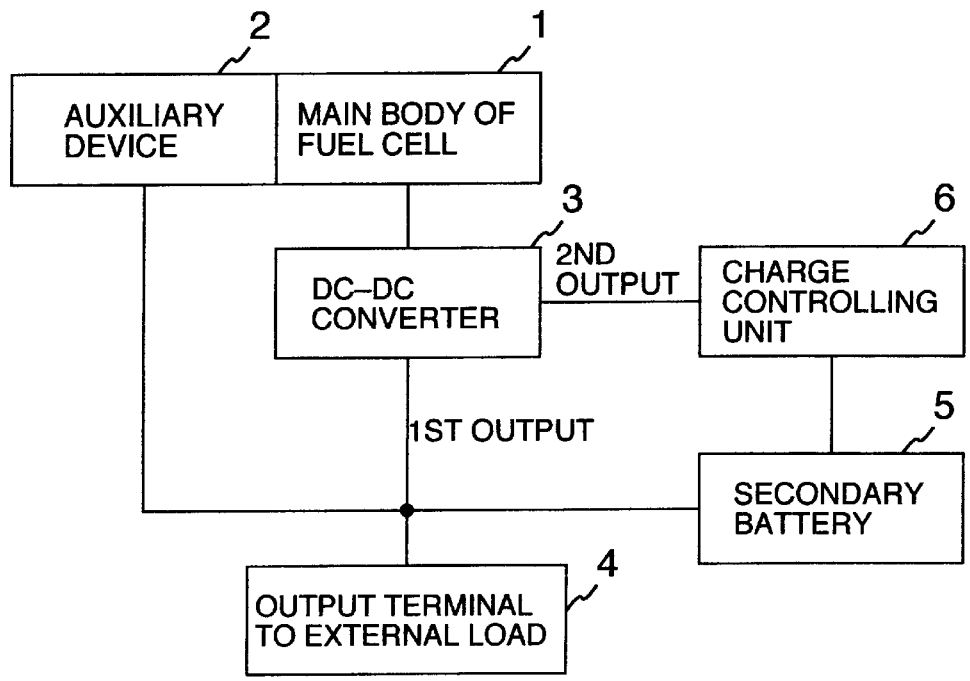
FIG. 2 is a schematic configuration diagram of a conventional power supply system.
Figure 3:
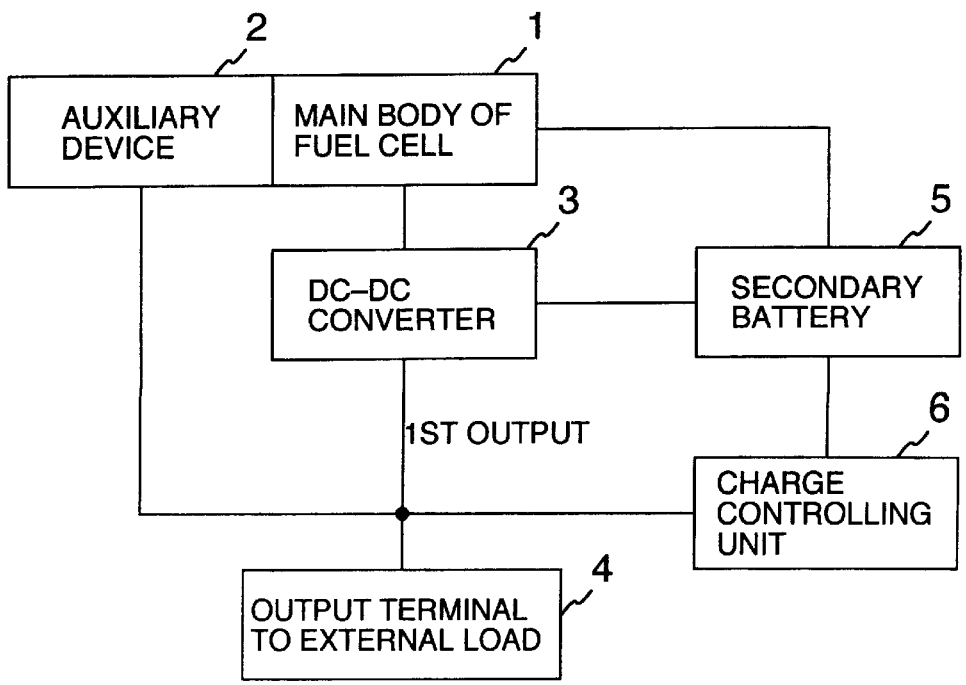
FIG. 3 is a schematic configuration diagram of a conventional power supply system.

The first invention in the present invention is a fuel cell device including a main body of the fuel cell, a DC-DC converter or a DC-AC converter for converting a direct current power into a direct current power of a predetermined voltage V 1 or an alternating current power thereof, the direct current power being outputted from the main body of the fuel cell, an output terminal to an external load, an auxiliary device necessary for driving the fuel cell device, a secondary battery that, when the main body of the fuel cell is lacking in output, outputs an output voltage V 2 for driving the auxiliary device, the auxiliary device being necessary for driving the fuel cell device, a charge controlling unit for controlling charge of the secondary battery, and a circuit-switching controlling unit for controlling supply of the output power from the DC-DC converter or the DC-AC converter to the external load output terminal, the auxiliary device and the charge controlling unit, and for controlling supply of the output power from the secondary battery, the auxiliary device being necessary for driving the fuel cell device, wherein the relation between the output voltage V 1 from the DC-DC converter or the DC-AC converter and the output voltage V 2 from the secondary battery is so set as to satisfy V 1>V 2, and when the output voltage V from the main body of the fuel cell becomes lower than a predetermined voltage V 3 at the time of a sudden change of the external load, the output to the charge controlling unit is stopped, and when the output voltage V from the main body of the fuel cell is lowered even further and becomes lower than a predetermined voltage V 4, the output to the auxiliary device is switched from the output from the DC-DC converter or the DC-AC converter to the output from the secondary battery, the auxiliary device being necessary for driving the fuel cell device.

Also, the second invention in the present invention is a fuel cell device the configuration of which is the same as that of the above-described first invention, wherein the relation between the output voltage V 1 from the DC-DC converter or the DC-AC converter and the output voltage V 2 from the secondary battery is so set as to satisfy V 1>V 2, and when the output voltage V from the main body of the fuel cell becomes lower than a predetermined voltage V 3 at the time of a sudden change of the external load, the output to the charge controlling unit is stopped, and when the output voltage V from the main body of the fuel cell is lowered even further and becomes lower than a predetermined voltage V 4, the output to the auxiliary device is switched from the output from the DC-DC converter or the DC-AC converter to the output from the secondary battery, the auxiliary device being necessary for driving the fuel cell device, and also when the output voltage V from the main body of the fuel cell becomes higher than a predetermined recoverying voltage V 6, the output to the charge controlling unit is restarted, and when the output voltage V from the main body of the fuel cell becomes higher than a recoverying voltage V 7, the output to the auxiliary device is restarted, the auxiliary device being necessary for driving the fuel cell device.

Moreover, based on the output voltage V from the main body of the fuel cell, a value of auxiliary device output from the auxiliary device is made large when the output voltage V is lower than a predetermined voltage, and is made small when the output voltage V is higher than the predetermined voltage, the auxiliary device being necessary for driving the fuel cell device.

Also, in the case where there exist a plurality of the auxiliary devices that are necessary for driving the fuel cell device, the plurality of driving auxiliary devices are driven in series when they are driven by the output from the DC-DC converter or the DC-AC converter, and are driven in parallel to each other when they are driven by the output from the secondary battery.

EMBODIMENT 1

FIG. 1 shows a schematic configuration diagram of a fuel cell device that employs a main body of a fuel cell that is an embodiment of the present invention. In FIG. 1, a reference numeral 1 denotes the main body of the fuel cell formed by stacking a plurality of unit cells in each of which an electrolyte layer is held by being sandwiched between a fuel flow field and an air flow field. The fuel flow field and the air flow field in each cell are supplied with fuel gas and air, respectively, and an electrical chemical reaction is caused to occur, thereby generating the electric power. A numeral 2 denotes an auxiliary device for supplying the main body of the fuel cell 1 with hydrogen gas and air. A numeral 3 denotes a DC-DC converter for converting a direct current power, which is outputted from the main body of the fuel cell 1, into a direct current power of a predetermined voltage V 1. A numeral 4 denotes an output terminal to an external load, which supplies the external load with the power. A numeral 5 denotes a secondary battery that outputs an output voltage V 2 for driving the auxiliary device 2 when the output voltage from the main body of the fuel cell 1 is lowered. A numeral 6 denotes a charge controlling unit for controlling charge of the secondary battery 5. A numeral 7 denotes a circuit-switching controlling unit for controlling supply of the output power from the DC-DC converter 3 to the external load output terminal 4, the auxiliary device 2 and the charge controlling unit 6, and for controlling supply of the output power from the secondary battery 5 to the auxiliary device 2. A numeral 8 denotes a control switch for controlling the external output from the main body of the fuel cell 1. A numeral 9 denotes a sensor unit for monitoring the output voltage from the main body of the fuel cell 1 so as to provide the circuit-switching controlling unit 7 with a control signal. A numeral 10 denotes a cell protecting switch A for breaking a circuit between the secondary battery 5 and the charge controlling unit 6. A numeral 11 denotes a cell protecting switch B for breaking the secondary battery 5 from the circuit-switching controlling unit 7. These respective configuration units constitute the fuel cell device.

In the fuel cell device including the members as described above, the protecting switches A 10, B 11 for protecting the secondary battery 5 are closed, and after supplying the main body of the fuel cell 1 with the hydrogen, i.e., the fuel, the control switch 8 is closed. This procedure completes starting-up of the fuel cell device. When the starting-up is completed and the main body of the fuel cell 1 is put into a steady operation, the direct current power caused by the main body of the fuel cell 1 is converted into the direct current power of the predetermined voltage V 1 by the DC-DC converter 3, then being steadily supplied to the external load output terminal 4 through the circuit-switching controlling unit 7. In the state where the power output to the external load is being steady, if a sudden change in the load occurs and then the output voltage V from the main body of the fuel cell 1 is lowered temporarily and becomes lower than a predetermined voltage V 3, the output to the charge controlling unit 6 is stopped at the circuit-switching controlling unit 7 in accordance with the signal from the sensor unit 9. In addition, when the output voltage V is lowered even further and becomes lower than a certain specified voltage V 4, the output to the auxiliary device 2 is stopped at the circuit-switching controlling unit 7 in accordance with the signal from the sensor unit 9. At the same time, the output power to the auxiliary device 2 is switched to the output power from the secondary battery 5. This procedure reduces the load imposed on the main body of the fuel cell 1, thereby making it possible to maintain the value of the output voltage V at a value higher than a minimum operation voltage V 5 at the load side.

Here, the relation that holds among V 3, V 4 and V 5 is given by the following formula (1):

$$V3 \leq V4 > V5 \tag{1}$$

After that, when, on account of recovery of the output voltage V from the main body of the fuel cell 1 or the reduction of the external load, the output voltage V becomes higher than a predetermined recoverying voltage V 6, the output to the auxiliary device 2 is restarted at the circuit-switching controlling unit 7 in accordance with the signal from the sensor unit 9. At the same time, the output power to the auxiliary device 2 is switched from the output power from the secondary battery 5 to that from the DC-DC converter 3. In addition, when the value of the output voltage V is heightened even further and becomes higher than a predetermined recoverying voltage V 7, the output to the charge controlling unit 6 is restarted at the circuit-switching controlling unit 7 in accordance with the signal from the sensor unit 9. This procedure makes it possible to supply the external load with stable power.

Here, the relation between V 6 and V 7 is given by the following formulae (2), (3) and (4):

$$V6 \leq V7 \tag{2}$$

$$V3 \leq V7 \tag{3}$$

$$V4 \leq V6 \tag{4}$$

Furthermore, the relation between the output voltage V 1 from the DC-DC converter 3 and the secondary battery output voltage V 2 is so set as to satisfy V 1>V 2.

Figure 4:
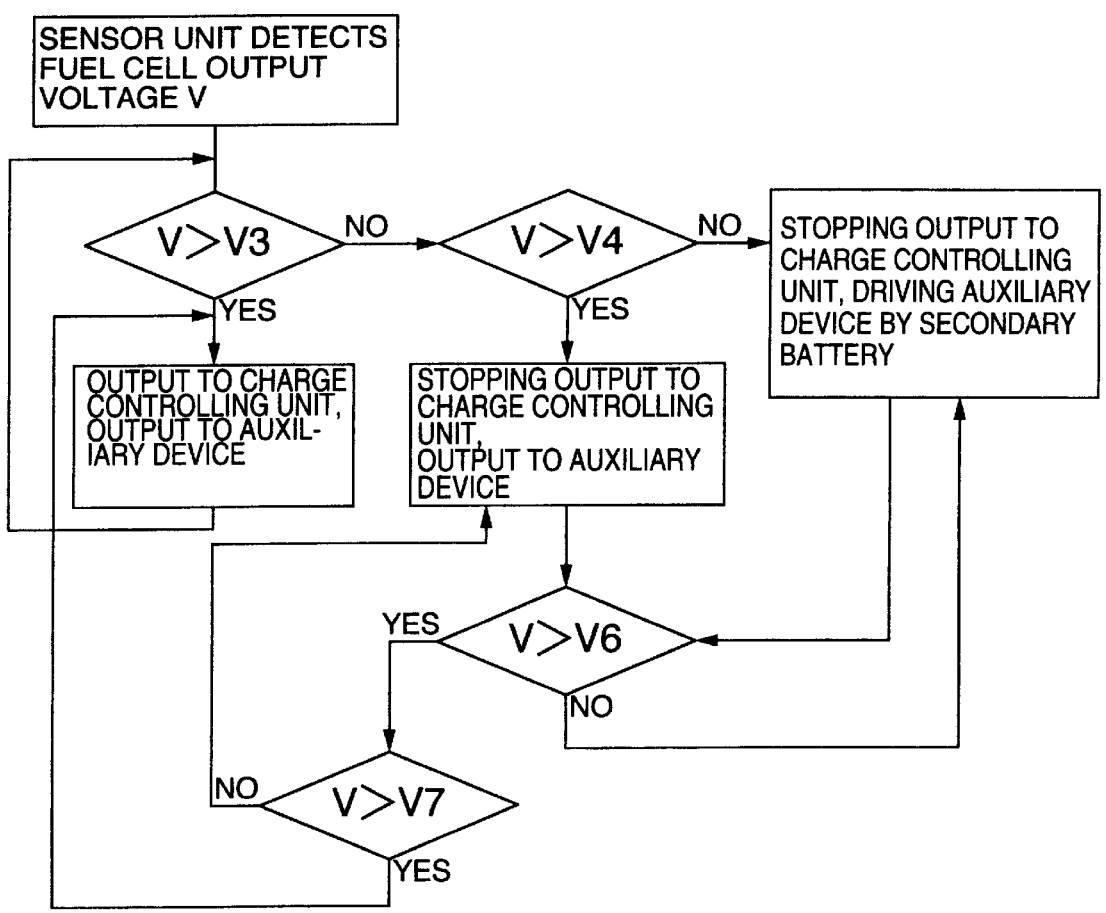
FIG. 4 is a flow chart for showing an algorithm for the circuit-switching control based on the output voltage V from the fuel cell.

FIG. 4 shows a circuit-switching algorithm for the above-mentioned circuit-switching controlling unit 7 in the fuel cell device.

In the fuel cell device configured as described above, it turns out that the DC-DC converter 3 is configured to be equipped with 1 line of output. Moreover, since the secondary battery output voltage V 2 is lower than the output voltage V 1 from the DC-DC converter 3, configuration of the charge controlling unit 6 becomes simpler. Also, the output power from the secondary battery 5 is supplied without the intervention of the DC-DC converter 3, which allows the power loss to be reduced. Incidentally, it is allowable to use the DC-AC converter instead of the DC-DC converter 3 used in the above-mentioned fuel cell device.

EMBODIMENT 2

Figure 5:
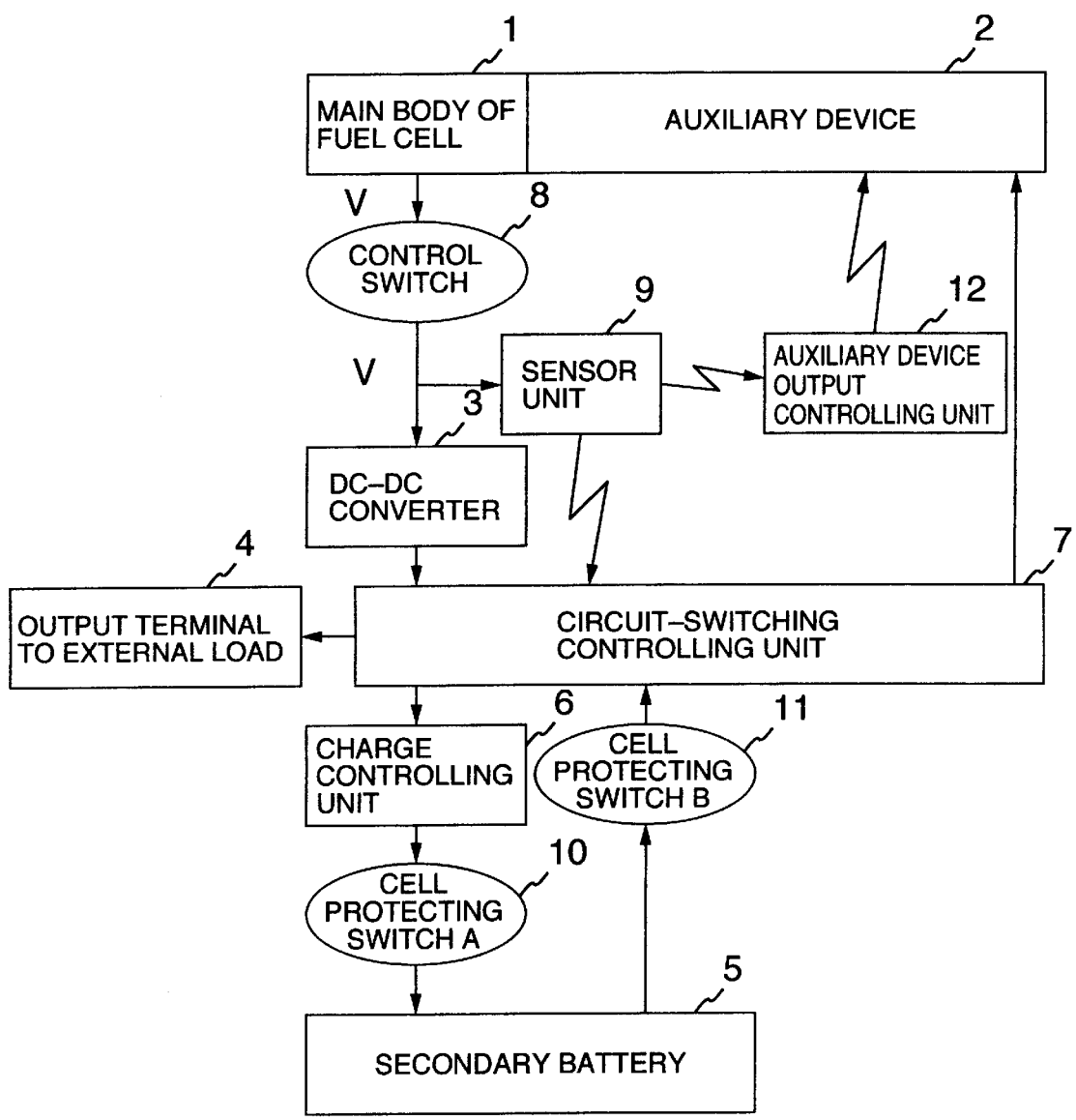
FIG. 5 is a schematic configuration diagram of a power supply system that employs the solid polymer electrolyte fuel cell in an embodiment of the present invention.

FIG. 5 shows a schematic configuration diagram of a fuel cell device that employs a main body of a fuel cell that is another embodiment of the present invention. In the fuel cell device of the configuration employed in the Embodiment 1, when a fan for supplying the main body of the fuel cell 1 with air is used as the auxiliary device 2, there is provided an auxiliary device output controlling unit 12 that controls the rotation speed of the fan in accordance with the signal from the sensor unit 9 for monitoring the value of the output voltage V. If the external load is heavy and the value of the output voltage V from the main body of the fuel cell 1 is small, the auxiliary device output controlling unit 12 increases the rotation speed of the fan. Conversely, if the external load is light and the value of the output voltage V from the main body of the fuel cell 1 is large, the auxiliary device output controlling unit 12 decreases the rotation speed of the fan.

The fuel cell device configured as described above allows an efficient operation to be embodied in the following manner: When, at the time of a light load, the main body of the fuel cell 1 does not require large amount of air, the fuel cell device drops the rotation speed of the fan, thereby reducing a power loss. Also, when, at the time of a heavy load, the main body of the fuel cell 1 requires large amount of, the fuel cell device raises the rotation speed of the fan, thereby performing sufficient power generation.

EMBODIMENT 3

Figure 6:
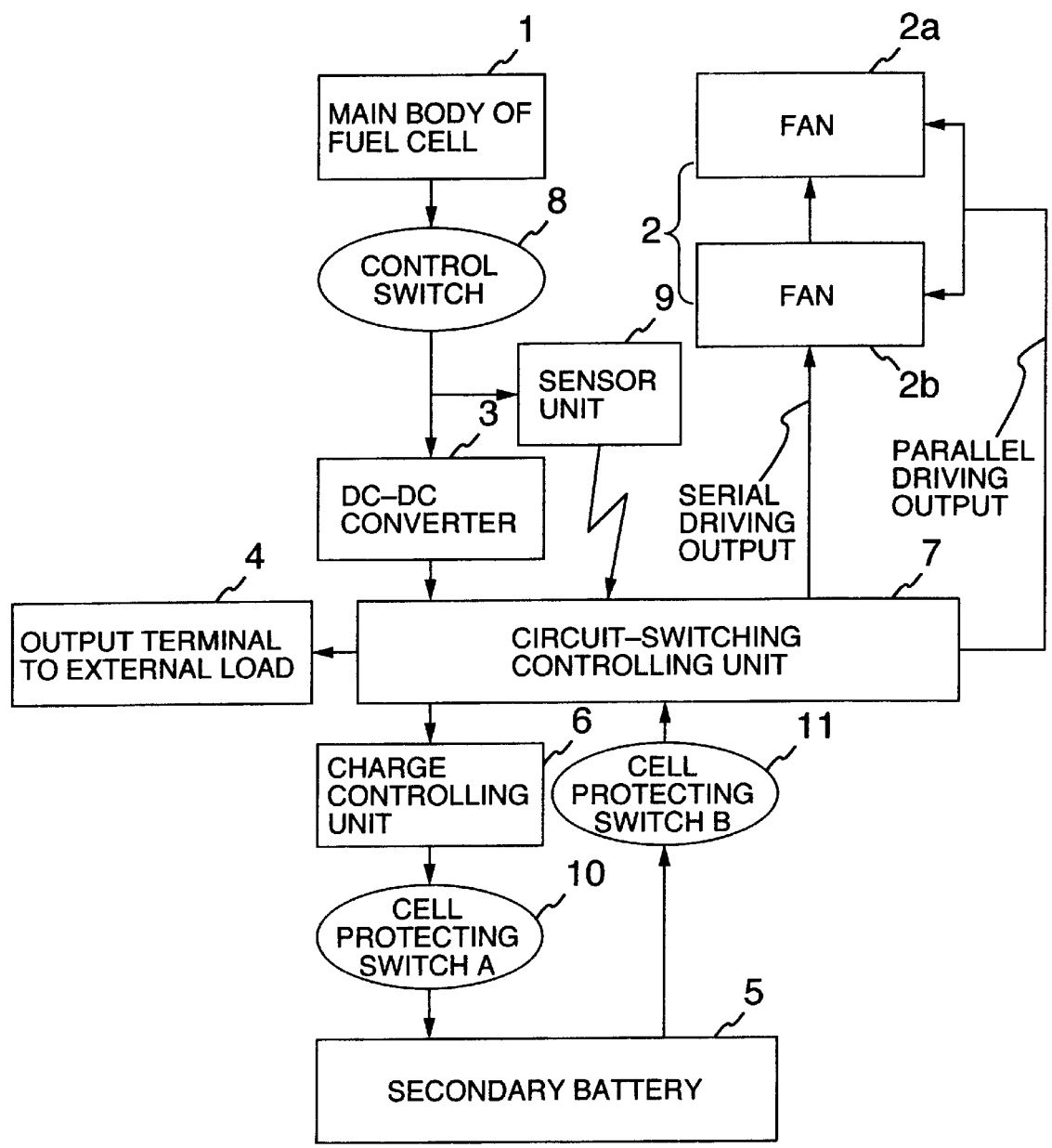
FIG. 6 is a schematic configuration diagram of a power supply system that employs the solid polymer electrolyte fuel cell in an embodiment of the present invention.

FIG. 6 shows a schematic configuration diagram of a fuel cell device that employs a main body of a fuel cell that is still another embodiment of the present invention. In the fuel cell device of the configuration employed in the Embodiment 1, as the auxiliary devices 2, there are provided the 1st fan 2a and the 2nd fan 2b for supplying the main body of the fuel cell 1 with air. In addition, there is further provided a circuit-switching controlling unit 7 having a function that, when the output voltage V from the main body of the fuel cell 1 becomes equal to a predetermined voltage V 4 and based on the signal from the sensor unit 9, switches driving outputs toward the 1st fan 2a and the 2nd fan 2b to the output from the DC-DC converter 3 and the output from the secondary battery 5.

When the output voltage V from the main body of the fuel cell 1 is higher than the predetermined voltage V 4, the 1st fan 2a and the 2nd fan 2b are driven in series by the output voltage V1 from the DC-DC converter 3. Also, when the value of the output voltage V becomes lower than the predetermined voltage V 4, the 1st fan 2a and the 2nd fan 2b are driven in parallel to each other by the output voltage V 2 from the secondary battery 5.

The fuel cell device of the embodiment 3 configured as described above makes it possible to minimize the variation of driving voltage for each fan in both cases where the fans are driven by the output voltage V1 from the DC-DC converter 3 and where the fans are driven by the output voltage V 2 from the secondary battery 5. Accordingly, it becomes possible to maintain air-supplying capabilities of the fans.

At this time, however, the relation between the DC-DC converter output voltage V 1 and the secondary battery output voltage V 2 is so set as to satisfy V 1>V 2.

Incidentally, it is allowable to use the DC-AC converter instead of the DC-DC converter 3 used in the above-mentioned fuel cell device.

As described above, the employment of the configurations of the fuel cell device according to the present invention makes it possible to accomplish provision of the simple, low cost and highly effective fuel cell device that permits the stable external load output to be obtained even at the time of the sudden change of the external load.

What is claimed is:

1. A fuel cell device, comprising:
   a main body of a fuel cell,
   a DC-DC converter or a DC-AC converter for converting direct current power into direct current power of a predetermined voltage V 1 or an alternating current power thereof so as to output said direct or alternating current power, said direct current power being outputted from said main body of the fuel cell, an output terminal to an external load, an auxiliary device necessary for driving said fuel cell device, a secondary battery that, when said output from said main body of the fuel cell is lacking, generates an output voltage V 2 for driving said auxiliary device, said auxiliary device being necessary for driving said fuel cell device, a charge controlling unit for controlling charge of said secondary battery, and a circuit-switching controlling unit for controlling supply of said output power from said DC-DC converter or said DC-AC converter to said output terminal to said external load, said auxiliary device and said charge controlling unit, and for controlling supply of said output power from said secondary battery, said auxiliary device being necessary for driving said fuel cell device, wherein the relation between said output voltage V 1 from said DC-DC converter or said DC-AC converter and said secondary battery output voltage V 2 is so set as to satisfy V 1>V 2, and when said output voltage V from said main body of the fuel cell becomes lower than a predetermined voltage V 3 at the time of a sudden change of said external load, said output to said charge controlling unit is stopped, and when said output voltage V from said main body of the fuel cell is lowered even further and becomes lower than a predetermined voltage V 4, said output to said auxiliary device is switched from said output from said DC-DC converter or said DC-AC converter to said output from said secondary battery, said auxiliary device being necessary for driving said fuel cell device.

2. The fuel cell device as claimed in claim 1, wherein, based on said output voltage V from said main body of the fuel cell, a value of output from said auxiliary device is increased when said output voltage V is lower than a predetermined voltage, said value of said auxiliary device output being lowered when said output voltage V is higher than said predetermined voltage, said auxiliary device being necessary for driving said fuel cell device.

3. The fuel cell device as claimed in claim 1, wherein there are provided a plurality of said auxiliary devices, said auxiliary devices being necessary for driving said fuel cell device, when said plurality of driving auxiliary devices are driven by said output from said DC-DC converter or said DC-AC converter, said plurality of auxiliary devices being driven in series to each other, when driven by said secondary battery output, said plurality of auxiliary devices being driven in parallel to each other.

4. A fuel cell device, comprising:

a main body of a fuel cell, a DC-DC converter or a DC-AC converter for converting direct current power into direct current power of a predetermined voltage V 1 or an alternating current power thereof so as to output said direct or alternating current power, said direct current power being outputted from said main body of the fuel cell, an output terminal to an external load, an auxiliary device necessary for driving said fuel cell device, a secondary battery that, when said output from said main body of the fuel cell is lacking the output, generates an output voltage V 2 for driving said auxiliary device, said auxiliary device being necessary for driving said fuel cell device, a charge controlling unit for controlling charge of said secondary battery, and a circuit-switching controlling unit for controlling supply of said output power from said DC-DC converter or said DC-AC converter to said output terminal to said external load, said auxiliary device and said charge controlling unit, and for controlling supply of said output power from said secondary battery, said auxiliary device being necessary for driving said fuel cell device, wherein the relation between said output voltage V 1 from said DC-DC converter or said DC-AC converter and said secondary battery output voltage V 2 is so set as to satisfy V 1>V 2, and when said output voltage V from said main body of the fuel cell becomes lower than a predetermined voltage V 3 at the time of a sudden change of said external load, said output to said charge controlling unit is stopped, and when said output voltage V from said main body of the fuel cell is lowered even further and becomes lower than a predetermined voltage V 4, said output to said auxiliary device is switched from said output from said DC-DC converter or said DC-AC converter to said output from said secondary battery, said auxiliary device being necessary for driving said fuel cell device, and also when said output voltage v from said main body of the fuel cell becomes higher than a predetermined recoverying voltage V 6, said output to said charge controlling unit is restarted, and when said output voltage V from said main body of the fuel cell becomes higher than a recoverying voltage V 7, said output to said auxiliary device is restarted, said auxiliary device being necessary for driving said fuel cell device.

5. The fuel cell device as claimed in claim 4, wherein, based on said output voltage V from said main body of the fuel cell, a value of output from said auxiliary device is increased when said output voltage V is lower than a predetermined voltage, said value of said auxiliary device output being lowered when said output voltage V is higher than said predetermined voltage, said auxiliary device being necessary for driving said fuel cell device.

6. The fuel cell device as claimed in claim 4, wherein there are provided a plurality of said auxiliary devices, said auxiliary devices being necessary for driving said fuel cell device, when said plurality of driving auxiliary devices are driven by said output from said DC-DC converter or said DC-AC converter, said plurality of auxiliary devices being driven in series to each other, when driven by said secondary battery output, said plurality of auxiliary devices being driven in parallel to each other.

* * * * *